United States Patent Office.

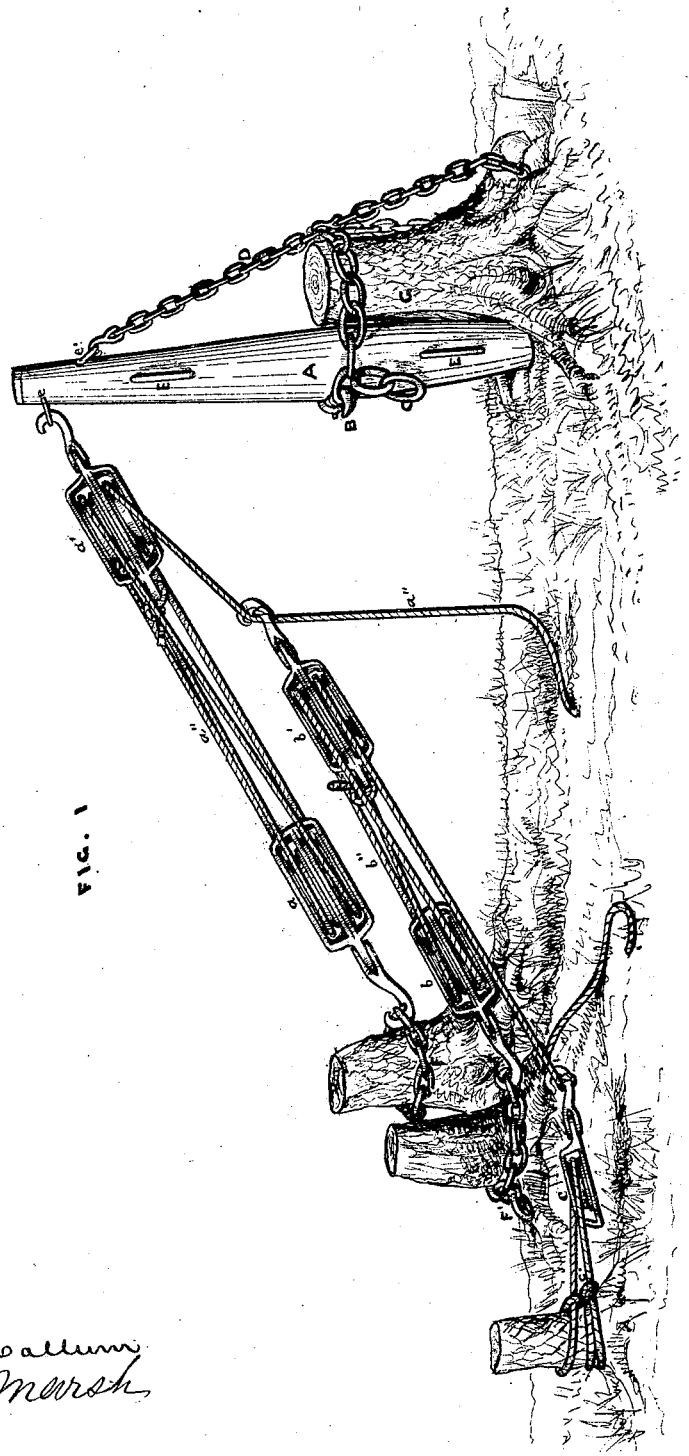

DANIEL S. CHAPMAN, OF CONNEAUT, OHIO.

Letters Patent No. 95,427, dated October 5, 1869.

IMPROVEMENT IN STUMP-EXTRACTORS.

The Schedule referred to in these Letters Patent and making part of the same

*To all whom it may concern:*

Be it known that I, DANIEL S. CHAPMAN, of Conneaut, in the county of Ashtabula, and State of Ohio, have invented a new and useful Stump-Extractor; and I do hereby declare that the following is a full, clear, and exact description thereof, reference being had to the accompanying drawings, and to the letters of reference marked thereon.

The nature of my invention consists in providing a simple, effectual, and economical apparatus for extracting or uprooting the stumps of trees, an apparatus that can be easily handled and moved from place to place with facility, and without danger of injury to its parts by breakage in removal.

I am aware that many and various stump-extracting machines have been invented, but the great majority of them are too expensive both as to construction and operation to be of much use. Others, again, operate in such a manner as to break up the stumps without extracting them, thus involving an additional expense in their removal from the soil.

By my apparatus the stumps are uprooted and turned over as effectually and somewhat on the same natural principle as trees are thrown down and uprooted by their own perpendicular leverage, when subjected to violent force of wind.

In the accompanying drawings—

Figure 1 is a perspective view of my apparatus fixed for operation;

Figure 2, a front elevation of the upright lever A; and

Figure 3, a sectional view of same.

A is an upright or perpendicular lever, of strong, tough wood, or other suitable material, shod with metal at the upper extremity, though it is immaterial whether it be shod or not at either end.

I prefer to have this lever about ten feet high, but it may be made of any suitable height.

It is furnished with a metallic yoke, B, to hold the stump-chain C in its proper position, and prevent abrasion.

It is also furnished with dog-handles, E, for convenience in handling, and staples $e$ $e'$.

C is the stump-chain, of strong, heavy metal,

D, the guy-chain, and

F F', the anchor-chains.

$a$ $a'$ $a''$, the purchase-blocks and tackle, $b$ $b'$ $b''$, the luff-blocks and tackle, and $c$ $c'$, a running-block and tackle.

G is the stump to be uprooted.

In using my apparatus, I proceed as follows:

After surveying the field to be cleared of stumps, with a view to determine the most suitable place of beginning, I set the perpendicular lever A on end, close up against the stump to be uprooted, and fasten them together by girdling them with the strong stump-chain C, fastening the chain on the horns of yoke B. If the stump is sound and not very large, this is all the fastening required, but if unsound at top, or difficult to uproot, I attach the guy-chain D, hitching one end round some prominent root, and hooking the other to staple $e'$, or its equivalent.

I then attach the purchase-block $a'$ to staple $e$, or its equivalent, and the block $a$ to anchor-chain F, secured around the most convenient stump, and apply the motive-power to tackle $a''$. The effect is to draw down the upright lever A from the perpendicular to the horizontal, bringing the stump with it.

This will uproot most stumps, but if more power should be necessary, I hitch on luff-block $b'$ to tackle $a''$, and attach block $b$ to another stump by anchor-chain F', and again apply the motive-power to tackle $b''$. This power may again be augmented by adding the running-block and tackle $c$ $c'$, but in an extended experience with my apparatus, the necessity for such extraordinary power is of very rare occurrence, the principal use of the block and tackle $c$ $c'$ being to completely upturn the stump after it is rooted, which I accomplish by hitching it to a chain attached to the roots, and applying the motive-power in the usual way.

After the stump is uprooted, I move the lever and stump-chain to the next stump most convenient to those to which the blocks are attached, and proceed as before without shifting the anchor-chain.

It thus frequently happens that I can uproot a number of stumps without shifting the blocks, but cases will arise in which there will be no stump to attach the anchor-chains to. In such a case, (a very rare occurrence,) I take the nearest live tree or gate-post, and failing such, I drive in a good stout post, which answers the same purpose when guyed.

I claim as my invention—

1. The perpendicular lever A and yoke B, in combination with stump-chain C and guy-chain D, substantially as and for the purpose set forth.

2. The perpendicular lever A, as described, with yoke B, handles E, staples $e$ $e'$, or their equivalent, in combination with stump-chain C, guy-chain D, and anchor-chains F F', purchase-blocks and tackle $a$ $a'$ $a''$, luff-blocks and tackle $b$ $b'$ $b''$, and running-block and tackle $c$ $c'$, substantially as and for the purpose described.

3. The construction and operation of the apparatus as a whole, in the manner and for the purpose herein specified.

D. S. CHAPMAN.

Witnesses:
A. McCALLUM,
R. H. MARSH.